(12) United States Patent
Kasuya et al.

(10) Patent No.: US 11,984,272 B2
(45) Date of Patent: May 14, 2024

(54) SOLID ELECTROLYTIC CAPACITOR (71) Applicant: Murata Manufacturing Co., Ltd., Nagaokakyo (JP)

(72) Inventors: Junichi Kasuya, Nagaokakyo (JP); Kenichi Oshiumi, Nagaokakyo (JP); Koji Fujimoto, Nagaokakyo (JP); Kazutoyo Horio, Nagaokakyo (JP); Satoshi Tani, Nagaokakyo (JP); Katsutomo Aritomi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 58 days.

(21) Appl. No.: 17/832,929

(22) Filed: Jun. 6, 2022

(65) Prior Publication Data

US 2022/0301787 A1    Sep. 22, 2022

Related U.S. Application Data (63) Continuation of application No. PCT/JP2020/045308, filed on Dec. 4, 2020.

(30) Foreign Application Priority Data

Dec. 6, 2019 (JP) ................................ 2019-221482

(51) Int. Cl.
| | | |
|---|---|---|
| *H01G 9/10* | (2006.01) | |
| *H01G 9/012* | (2006.01) | |
| *H01G 9/15* | (2006.01) | |

(52) U.S. Cl.
CPC ............... *H01G 9/10* (2013.01); *H01G 9/012* (2013.01); *H01G 9/15* (2013.01)

(58) Field of Classification Search
None
See application file for complete search history.

(56) References Cited

U.S. PATENT DOCUMENTS

| | | |
|---|---|---|
| 2017/0365415 A1 | 12/2017 | Demizu et al. |
| 2019/0122827 A1 | 4/2019 | Furukawa et al. |
| 2019/0237266 A1 | 8/2019 | Tsutsumi |

FOREIGN PATENT DOCUMENTS

| | | |
|---|---|---|
| JP | 2001185460 A * | 7/2001 |
| JP | 2001358032 A | 12/2001 |

(Continued)

OTHER PUBLICATIONS

International Search Report in PCT/JP2020/045308, dated Feb. 16, 2021, 3 pages.

*Primary Examiner* — Eric W Thomas
(74) *Attorney, Agent, or Firm* — Arentfox Shiff LLP (57) ABSTRACT

A solid electrolytic capacitor that includes a resin molding including: a capacitor element laminate, the capacitor element laminate including a first layer and a second layer that are laminated together, the first layer includes a valve-action metal substrate exposed at a first end surface of the resin molding, the second layer includes an electrode lead-out layer exposed at a second end surface of the resin molding; an insulating substrate; and a sealing resin enclosing the capacitor element laminate; a first external electrode on a first end surface of the resin molding and connected to the valve-action metal substrate; a second external electrode on a second end surface of the resin molding and connected to the electrode lead-out layer; and a dummy layer not contributing to a capacity of the capacitor on a main surface of the capacitor element laminate in a lamination direction thereof and adjacent to the insulating substrate.

13 Claims, 4 Drawing Sheets

Cross-sectional view taken along line A-A (56) References Cited

FOREIGN PATENT DOCUMENTS

| | | | | |
|---|---|---|---|---|
| JP | 2004241435 | A | * | 8/2004 |
| JP | 2008270447 | A | | 11/2008 |
| JP | 2010062406 | A | * | 3/2010 |
| JP | 2011216638 | A | | 10/2011 |
| JP | 2018198297 | A | | 12/2018 |
| JP | 201979866 | A | | 5/2019 |
| WO | 2018074407 | A1 | | 4/2018 |

* cited by examiner

Cross-sectional view taken along line A-A

SOLID ELECTROLYTIC CAPACITOR

CROSS REFERENCE TO RELATED APPLICATIONS

The present application is a continuation of International application No. PCT/JP2020/045308, filed Dec. 4, 2020, which claims priority to Japanese Patent Application No. 2019-221482, filed Dec. 6, 2019, the entire contents of each of which are incorporated herein by reference.

FIELD OF THE INVENTION

The present invention relates to a solid electrolytic capacitor.

BACKGROUND OF THE INVENTION

Patent Literature 1 discloses a method of efficiently producing multiple solid electrolytic capacitors.
Patent Literature 1: JP 2019-79866 A

SUMMARY OF THE INVENTION

Patent Literature 1 discloses a method of efficiently producing solid electrolytic capacitors, the method including stacking a first sheet and a second sheet into a multilayer sheet, cutting the multilayer sheet into multiple capacitor element laminates, and forming external electrodes on each capacitor element laminate.

Elements that define individual solid electrolytic capacitors after cutting are laid out on the first sheet and the second sheet, so that precise alignment of the first sheet and the second sheet is required for stacking.

Examples of methods for such precise alignment include one in which the first sheet and the second sheet are stacked on a substrate provided with a positioning guide or the like.

When the substrate is not removed from a solid electrolytic capacitor produced by such a method, the substrate is kept on the bottom. When the solid electrolytic capacitor with the substrate kept on the bottom is heated by heat treatment such as reflow, the difference in coefficient of linear expansion between the substrate and the external electrodes causes delamination of the sheet closest to the substrate, which sometimes results in changes in equivalent series resistance (ESR) before and after reflow.

Thus, the present invention aims to provide a solid electrolytic capacitor in which changes in ESR before and after reflow are small.

A solid electrolytic capacitor of the present invention includes a resin molding including: a capacitor element laminate, wherein the capacitor element laminate includes a first layer and a second layer that are laminated together, the first layer includes a valve-action metal substrate exposed at a first end surface of the resin molding having a dielectric layer on a surface thereof and a solid electrolyte layer on the dielectric layer, the second layer includes an electrode lead-out layer exposed at a second end surface of the resin molding; an insulating substrate; and a sealing resin enclosing the capacitor element laminate; a first external electrode on the first end surface of the resin molding and electrically connected to the valve-action metal substrate; a second external electrode on the second end surface of the resin molding and electrically connected to the electrode lead-out layer; and a dummy layer not contributing to the capacity of the capacitor on a main surface of the capacitor element laminate in a lamination direction thereof and adjacent to the insulating substrate.

The present invention can provide a solid electrolytic capacitor in which changes in ESR before and after reflow are small.

DETAILED DESCRIPTION OF THE PREFERRED EMBODIMENTS

A solid electrolytic capacitor of the present invention is described below.

The present invention is not limited to the following preferred embodiments, and may be suitably modified without departing from the gist of the present invention. Combinations of two or more preferred features described in the following preferred embodiments of the present invention are also within the scope of the present invention.

Solid Electrolytic Capacitor

A solid electrolytic capacitor of the present invention includes a resin molding including: a capacitor element laminate, wherein the capacitor element laminate includes a first layer and a second layer that are laminated together, the first layer includes a valve-action metal substrate exposed at a first end surface of the resin molding having a dielectric layer on a surface thereof and a solid electrolyte layer on the dielectric layer, the second layer includes an electrode lead-out layer exposed at a second end surface of the resin molding; an insulating substrate; and a sealing resin enclosing the capacitor element laminate; a first external electrode on the first end surface of the resin molding and electrically connected to the valve-action metal substrate; a second external electrode on the second end surface of the resin molding and electrically connected to the electrode lead-out layer; and a dummy layer not contributing to the capacity of the capacitor on a main surface of the capacitor element laminate in a lamination direction thereof and adjacent to the insulating substrate.

When a substrate is used to improve dimensional accuracy for precise alignment of the sheets for stacking in the method disclosed in Patent Literature 1, the resulting solid electrolytic capacitor has the substrate kept on the bottom. When such a solid electrolytic capacitor is heated by heat treatment such as reflow, the difference in coefficient of linear expansion between the substrate and the external electrodes causes delamination of the sheet closest to the substrate, which results in changes in equivalent series resistance (ESR) before and after reflow.

In contrast, the solid electrolytic capacitor of the present invention includes a dummy layer not contributing to the capacity of the capacitor between the capacitor element laminate and the insulating substrate, so that ESR of the solid electrolytic capacitor remains the same even after delamination of the dummy layer. Thus, changes in ESR before and after reflow are small in the solid electrolytic capacitor of the present invention.

An example of the solid electrolytic capacitor of the present invention is described with reference to FIG. 1 and FIG. 2.

Figure 1:
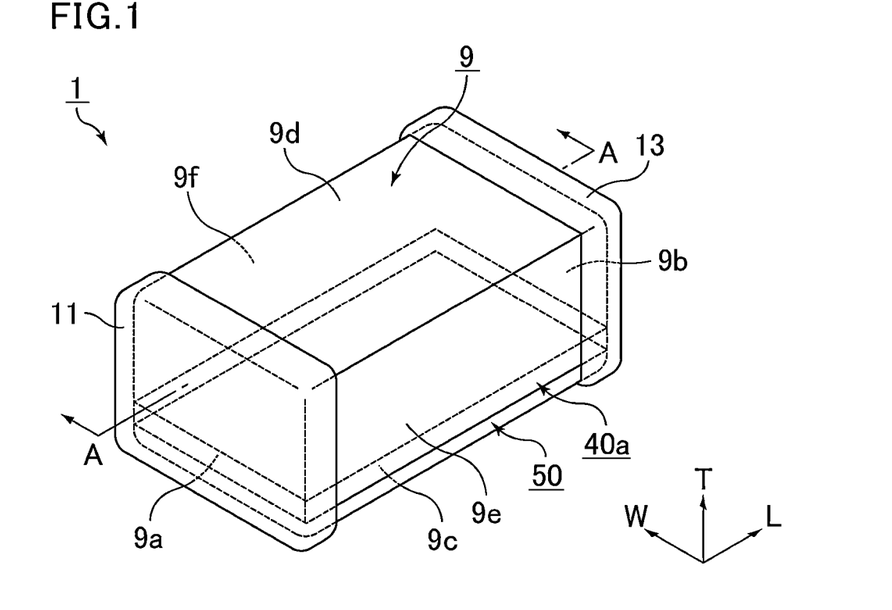
FIG. 1 is a schematic perspective view of an example of a solid electrolytic capacitor of the present invention.

FIG. 1 is a schematic perspective view of an example of a solid electrolytic capacitor of the present invention. FIG. 2 is a cross-sectional view taken along line A-A of the solid electrolytic capacitor shown in FIG. 1.

FIG. 1 shows a resin molding 9 defining a solid electrolytic capacitor 1. Preferably, the resin molding is cuboidal in shape.

The resin molding 9 has a length direction (L direction), a width direction (W direction), and a thickness direction (T direction), and includes a first end surface 9a and a second end surface 9b which are opposite to each other in the length direction. A first external electrode 11 is formed on the first end surface 9a, and a second external electrode 13 is formed on the second end surface 9b.

The resin molding 9 includes a bottom surface 9c and a top surface 9d which are opposite to each other in the thickness direction.

The resin molding 9 also includes a first side surface 9e and a second side surface 9f which are opposite to each other in the width direction.

Herein, a plane along the length direction (L direction) and the thickness direction (T direction) of the solid electrolytic capacitor or the resin molding is referred to as an "LT plane", a plane along the length direction (L direction) and the width direction (W direction) is referred to as an "LW plane", and a plane along the thickness direction (T direction) and the width direction (W direction) is referred to as a "WT plane".

The resin molding 9 has a cuboidal shape, and includes the top surface 9d and the bottom surface 9c as the LW planes, the first side surface 9e and the second side surface 9f as the LT planes, and the first end surface 9a and the second end surface 9b as the WT planes.

The resin molding 9 includes an insulating substrate 50 as a support substrate on its bottom, and a surface of the bottom of the insulating substrate 50 is the bottom surface 9c of the resin molding 9.

The insulating substrate is disposed to integrate a stack of multiple capacitor elements, and is preferably made of glass epoxy resin.

The corners of the resin molding 9 are rounded to have an R (curvature radius) by barrel polishing after molding in a resin mold. A resin molding is softer than a ceramic body and it is thus difficult to round each corner to have an R by barrel polishing. Yet, each corner can be rounded to have a small R by adjusting the composition, particle size, and shape of a medium, treatment time in a barrel, and the like.

Figure 2:
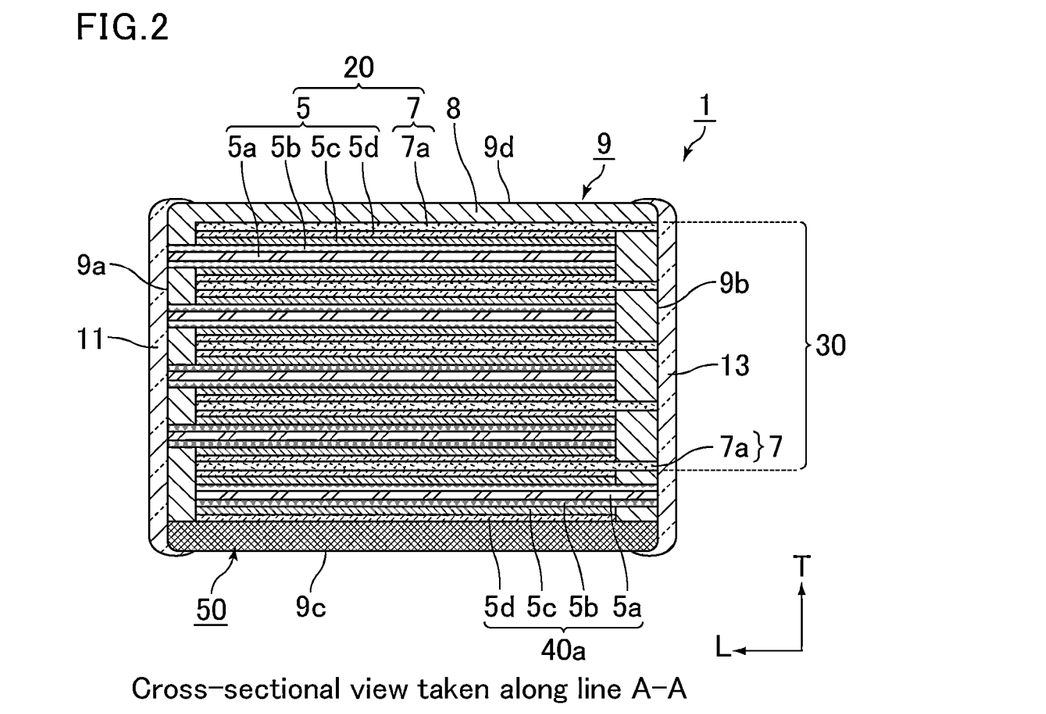
FIG. 2 is a cross-sectional view taken along line A-A of the solid electrolytic capacitor shown in FIG. 1.

As shown in FIG. 2, the resin molding 9 includes a capacitor element laminate 30, a dummy layer 40a, an insulating substrate 50, and a sealing resin 8 enclosing the capacitor element laminate 30.

The capacitor element laminate 30 includes first layers 5 and second layers 7 that are laminated together.

One first layer 5 and one second layer 7 together define a capacitor element 20, so that the capacitor element laminate 30 is regarded as a laminate of the capacitor elements 20.

In the capacitor element laminate 30, the first layers 5 and the second layers 7 that are alternately laminated together may be bonded to each other via a conductive adhesive (not shown).

The first external electrode 11 is formed on the first end surface 9a of the resin molding 9, and the first external electrode 11 is electrically connected to a valve-action metal substrate 5a exposed at the first end surface 9a.

The second external electrode 13 is formed on the second end surface 9b of the resin molding 9, and the second external electrode 13 is electrically connected to an electrode lead-out layer 7a exposed at the second end surface 9b.

The valve-action metal substrate 5a defining the capacitor element 20 is configured such that its end adjacent to the second end surface 9b is enclosed by the sealing resin 8. The valve-action metal substrate 5a is not in direct contact with a solid electrolyte layer 5c or a conductive layer 5d. When the end of the valve-action metal substrate 5a adjacent to the second end surface 9b is insulated by, for example, being covered with a dielectric layer 5b, the end of the valve-action metal substrate 5a adjacent to the second end surface 9b may be covered with the solid electrolyte layer 5c and the conductive layer 5d.

The first external electrode and the second external electrode are also simply referred to as "the external electrodes" collectively.

First Layer

Each first layer 5 includes the valve-action metal substrate 5a in the center and a porous layer such as an etched layer (not shown) on its surface. The dielectric layer 5b is disposed on a surface of the porous layer. Further, the solid electrolyte layer 5c is disposed on the dielectric layer 5b. Further, the conductive layer 5d is disposed on the solid electrolyte layer 5c.

Each first layer 5 is led out to the first end surface 9a of the resin molding 9 and electrically connected to the first external electrode 11.

The valve-action metal substrate is made of a valve-action metal having a valve action. Examples of the valve-action metal include elemental metals such as aluminum, tantalum, niobium, titanium, and zirconium, and alloys containing these metals. Of these, aluminum and an aluminum alloy are preferred.

The valve-action metal substrate may have any shape, but the shape is preferably flat, and is more preferably formed in foil.

Preferably, a porous portion is disposed on a surface of the valve-action metal substrate.

A porous portion on the surface of the valve-action metal substrate can increase the specific surface area of the valve-action metal substrate to increase the capacitance of the solid electrolytic capacitor.

The porous portion may be an etched layer formed on the surface of the valve-action metal substrate, or a porous layer formed on the surface of the valve-action metal substrate by printing or sintering. When the valve-action metal is aluminum or an aluminum alloy, an etched layer is preferred. When the valve-action metal is titanium or a titanium alloy, a porous layer is preferred.

The thickness of the valve-action metal substrate is not limited, but the thickness of the valve-action metal substrate excluding the porous portion is preferably 5 μm to 100 μm. The thickness of the porous portion (thickness on one side) is preferably 5 μm to 200 μm.

The dielectric layer on the surface of the porous portion is porous due to reflection of the surface state of the porous portion. The dielectric layer has a surface with fine irregularities.

Preferably, the dielectric layer is made of an oxide film of the valve-action metal. For example, when aluminum foil is used as the valve-action metal substrate, the aluminum foil is anodized in an aqueous solution containing boric acid, phosphoric acid, adipic acid, a sodium salt or an ammonium salt thereof, or the like, whereby an oxide film as a dielectric layer can be formed.

The dielectric layer is formed along the surface of the porous layer, whereby pores (recesses) are formed in the dielectric layer. The thickness of the dielectric layer is designed according to the withstand voltage and capacitance required for the solid electrolytic capacitor, but the thickness is preferably 10 nm to 100 nm.

In order to increase the production efficiency, the valve-action metal substrate including a dielectric layer on the surface may be chemically treated foil subjected to pre-chemical treatment.

Examples of materials of the solid electrolyte layer include a conductive polymer having a pyrrole, thiophene, or aniline skeleton. A conductive polymer having a thiophene skeleton is, for example, poly(3,4-ethylenedioxythiophene) (PEDOT), and may be PEDOT:PSS which is a complex with a dopant (poly(styrene sulfonate) (PSS)).

The solid electrolyte layer is formed by, for example, a method in which a polymerized film of poly(3,4-ethylenedioxythiophene) or the like is formed on a surface of the dielectric layer using a treatment liquid containing a monomer such as 3,4-ethylenedioxythiophene or a method in which a dispersion of a polymer such as poly(3,4-ethylenedioxythiophene) is applied to the surface of the dielectric layer and dried. Formation of the solid electrolyte layer for an inner layer for filling the pores (recesses) is preferably followed by formation of a solid electrolyte layer for an outer layer for covering the entire dielectric layer.

The solid electrolyte layer can be formed in a predetermined region by applying the treatment liquid or dispersion to the dielectric layer by, for example, sponge transfer, screen printing, spray coating, inkjet printing, or using a dispenser. The thickness of the solid electrolyte layer is preferably 2 μm to 20 μm.

The conductive layer is disposed to electrically and mechanically connect the solid electrolyte layer to the electrode lead-out layer. For example, the conductive layer is preferably a carbon layer, a graphene layer, or a silver layer formed by applying a conductive paste such as a carbon paste, a graphene paste, or a silver paste. The conductive layer may be a composite layer in which a silver layer is disposed on a carbon layer or a graphene layer, or a mixed layer containing a mixture of a carbon paste or a graphene paste with a silver paste.

The conductive layer can be formed on the solid electrolyte layer by applying a conductive paste such as a carbon paste by, for example, sponge transfer, screen printing, spray coating, inkjet printing, or using a dispenser. Preferably, an electrode lead-out layer formed in the subsequent step is stacked while the conductive layer is viscous before drying. The thickness of the conductive layer is preferably 2 μm to 20 μm.

A conductive adhesive layer may be disposed on the conductive layer.

Examples of materials of the conductive adhesive layer include mixtures of insulating resins such as an epoxy resin and a phenolic resin and conductive particles such as carbon and silver.

Second Layer

Each second layer 7 includes the electrode lead-out layer 7a.

Each electrode lead-out layer 7a is led out to the second end surface 9b of the resin molding 9 and electrically connected to the second external electrode 13.

Preferably, the electrode lead-out layer is made of at least one metal foil selected from the group consisting of Al, Cu, Ag, and an alloy mainly containing any of these metals. The electrode lead-out layer made of the metal foil can reduce the resistance of the electrode lead-out layer, and can reduce ESR.

The electrode lead-out layer may be metal foil whose surface is coated with carbon or titanium by a film formation method such as sputtering or deposition. Use of carbon-coated Al foil is more preferred. The thickness of the electrode lead-out layer is not limited. Yet, in order to facilitate handling in the production process, achieve miniaturization, and reduce ESR, the thickness is preferably 20 μm to 50 μm.

Preferably, the electrode lead-out layer is made of at least one metal foil selected from the group consisting of aluminum, copper, silver, and an alloy mainly containing any of these metals.

The electrode lead-out layer made of the metal foil can reduce the resistance of the electrode lead-out layer, and can reduce ESR.

The thickness of the electrode lead-out layer is not limited. Yet, in order to reduce ESR, the thickness is preferably 5 μm to 100 μm.

Preferably, a surface of the electrode lead-out layer includes a roughened surface.

A roughened surface on the surface of the electrode lead-out layer improves adhesion between the electrode lead-out layer and the conductive adhesive layer or adhesion between the electrode lead-out layer and other conductive layer, which can reduce ESR.

The roughened surface may be formed by any method, such as etching. In particular, when the electrode lead-out layer is made of aluminum, preferably, a roughened (etched) surface is coated with carbon or titanium in terms of lower resistance.

In addition, a coat layer made of an anchor coating agent may be formed on the electrode lead-out layer.

A coat layer made of an anchor coating agent on the surface of the electrode lead-out layer improves adhesion between the electrode lead-out layer and the solid electrolyte layer or adhesion between the electrode lead-out layer and other conductive layer, which can reduce ESR.

Dummy Layer

The capacitor element laminate 30 includes the dummy layer 40a on one of its main surfaces in the lamination direction.

The dummy layer is a layer not contributing to the capacity of the capacitor.

The dummy layer 40a includes the valve-action metal substrate 5a exposed at the second end surface 9b of the resin molding 9, the dielectric layer 5b on a surface of the valve-action metal substrate 5a, the solid electrolyte layer 5c on a surface of the dielectric layer 5b, and the conductive layer 5d on a surface of the solid electrolyte layer 5c.

The valve-action metal substrate 5a defining the dummy layer 40a is connected to its opposing electrode lead-out layer 7a via the second external electrode 13, and thus does not contribute to the capacity of the capacitor.

Insulated Substrate

The insulating substrate 50 is adjacent to the dummy layer 40a.

The insulating substrate is made of an insulating material.

Examples of the insulating material include a glass epoxy resin, a glass composite, a phenolic resin, a polyimide resin, a polyamide resin, a fluororesin, a polyphenylene oxide (PPO) resin, and a bismaleimide-triazine (BT) resin.

Preferably, the average coefficient of linear expansion of the insulating substrate in a direction along the lamination direction of the capacitor element laminate and in the temperature range of 20° C. to 260° C. is 80 [ppm/K] to 160 [ppm/K].

With the average coefficient of linear expansion in the above range, delamination of the layer (the first layer or the second layer) closest to the insulating substrate due to reflow easily results in changes in ESR. However, in the solid electrolytic capacitor of the present invention, the dummy layer not contributing to the capacity of the capacitor is delaminated, so that changes in ESR can be reduced or prevented.

Sealing Resin

The sealing resin 8 encloses the capacitor element laminate 30.

Of the surfaces of the capacitor element laminate, the surface at which the valve-action metal substrate is exposed is the first end surface of the resin molding.

Of the surfaces of the capacitor element laminate, the surface at which the electrode lead-out layer is exposed is the second end surface of the resin molding.

Of the surfaces of the capacitor element laminate, the surface opposite to the surface where the dummy layer and the insulating substrate are disposed is enclosed by the sealing resin.

The dummy layer may be covered with the sealing resin, if necessary.

The sealing resin at least contains a resin, and preferably contains a resin and filler.

Examples of the resin in the sealing resin include an epoxy resin, a phenolic resin, a polyimide resin, a silicone resin, a polyamide resin, and a liquid crystal polymer. Examples of the filler in the sealing resin include silica particles, alumina particles, and metal particles.

When the sealing resin contains a resin and filler, preferably, the maximum diameter of the filler is smaller than the minimum thickness of the electrode lead-out layer in order to ensure filling properties of the sealing resin.

Preferably, the maximum diameter of the filler in the sealing resin is, for example, in the range of 30 μm to 40 μm.

When a solid sealing material is used, the resin molding is preferably formed by a method that uses a resin mold such as a compression mold or a transfer mold. Use of a compression mold is more preferred. When a liquid sealing material is used, the resin molding is preferably formed by a method that uses a dispenser or printing. Preferably, a compression mold is used to enclose the capacitor element laminate, the dummy layer, and the insulating substrate by the sealing resin to produce a resin molding.

Coloration of the sealing resin is not limited, but preferably, a color different from the color of the insulating substrate is used.

When the color is different between the sealing resin and the insulating substrate, the sealing resin and the insulating substrate can be visually separated from each other, making it easy to observe the conditions of the sealing resin and the insulating substrate.

External Electrodes

The first external electrode and the second external electrode can be formed by, for example, plating, sputtering, immersion coating, or printing. In the case of plating, a plating layer may be, for example, a Zn·Ag·Ni layer, a Ag·Ni layer, a Ni layer, a Zn·Ni·Au layer, a Ni·Au layer, a Zn·Ni·Cu layer, or a Ni·Cu layer. Preferably, additional plating layers including a Cu plating layer, a Ni plating layer, and a Sn plating layer in the stated order (or without one or some of these layers) are formed on the above plating layers.

Preferably, the average coefficient of linear expansion of each of the first external electrode and the second external electrode in a direction along the lamination direction of the capacitor element laminate and in the temperature range from 20° C. to 260° C. is 5 [ppm/K] to 80 [ppm/K].

When the average coefficient of linear expansion of each of the first external electrode and the second external electrode is in the above range, the difference in coefficient of linear expansion between the insulating substrate and the external electrode tends to cause stress to be applied to the solid electrolytic capacitor due to heat during reflow, resulting in delamination in the capacitor element laminate and changes in ESR. However, in the solid electrolytic capacitor of the present invention, such changes in ESR can be reduced or prevented.

The average coefficient of linear expansion of the insulating substrate is an average coefficient of linear expansion in the range of 20° C. to 260° C., as measured in accordance with JIS C 6481 (1996). The coefficient of linear expansion of the material of the first external electrode and the second external electrode is an average coefficient of linear expansion in the range of 20° C. to 260° C., as measured by thermomechanical analysis (TMA).

Preferably, a difference in average coefficient of linear expansion between the insulating substrate and the first external electrode and a difference in average coefficient of linear expansion between the insulating substrate and the second external electrode in a direction along the lamination direction of the capacitor element laminate and in a temperature range of 20° C. to 260° C. are each 50 [ppm/K] or more.

When each difference in average coefficient of linear expansion is in the above range, the difference in coefficient of linear expansion between the insulating substrate and the external electrode tends to cause stress to be applied to the solid electrolytic capacitor due to heat during reflow, resulting in delamination in the capacitor element laminate and changes in ESR. However, in the solid electrolytic capacitor of the present invention, such changes in ESR can be reduced or prevented.

OTHER EMBODIMENT

Another example of the dummy layer defining the solid electrolytic capacitor of the present invention is described.

Examples of dummy layers other than the one shown in FIG. 2 include an insulating sheet, a valve-action metal substrate including a dielectric layer on its surface but not including a solid electrolyte layer on the surface of the dielectric layer, and an electrode lead-out layer exposed at the first end surface of the resin molding.

Figure 3:
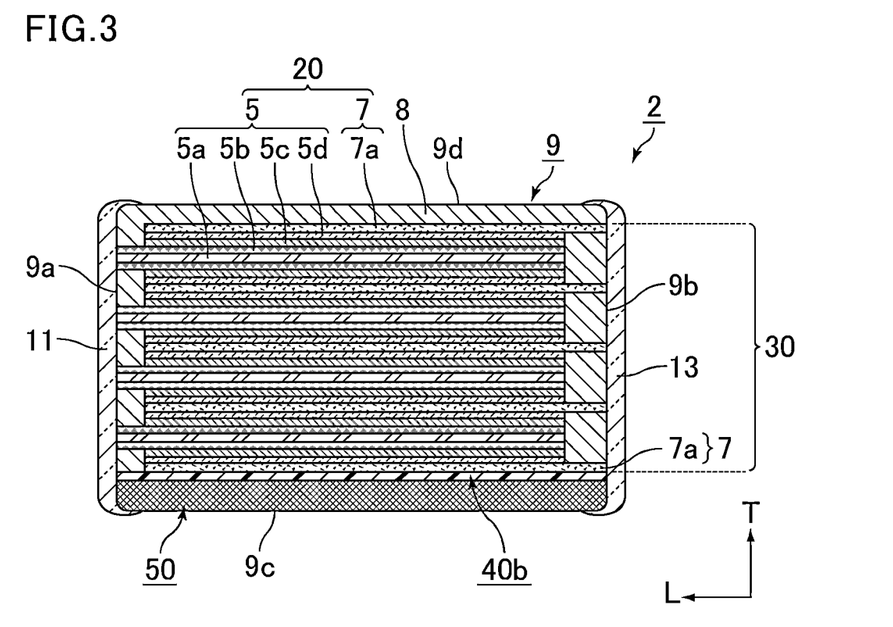
FIG. 3 is a schematic cross-sectional view of another example of the solid electrolytic capacitor of the present invention.

With reference to FIG. 3, the following describes the case where the dummy layer is an insulating sheet.

FIG. 3 is a schematic cross-sectional view of another example of the solid electrolytic capacitor of the present invention.

A solid electrolytic capacitor 2 shown in FIG. 3 includes the resin molding 9 including the capacitor element laminate 30, a dummy layer 40b, the insulating substrate 50, and the sealing resin 8 enclosing the capacitor element laminate 30.

The dummy layer 40b is made of an insulating sheet, and is not electrically connected to the first external electrode or the second external electrode. Thus, the dummy layer 40b does not contribute to the capacity of the capacitor.

Examples of materials of the insulating sheet include an epoxy resin, a polyimide resin, a fluororesin, a polyamide resin, a silicone resin, and a liquid crystal polymer.

The insulating sheet may be made of the same material as the one used for an insulating substrate (described later) and the sealing resin.

Figure 4:
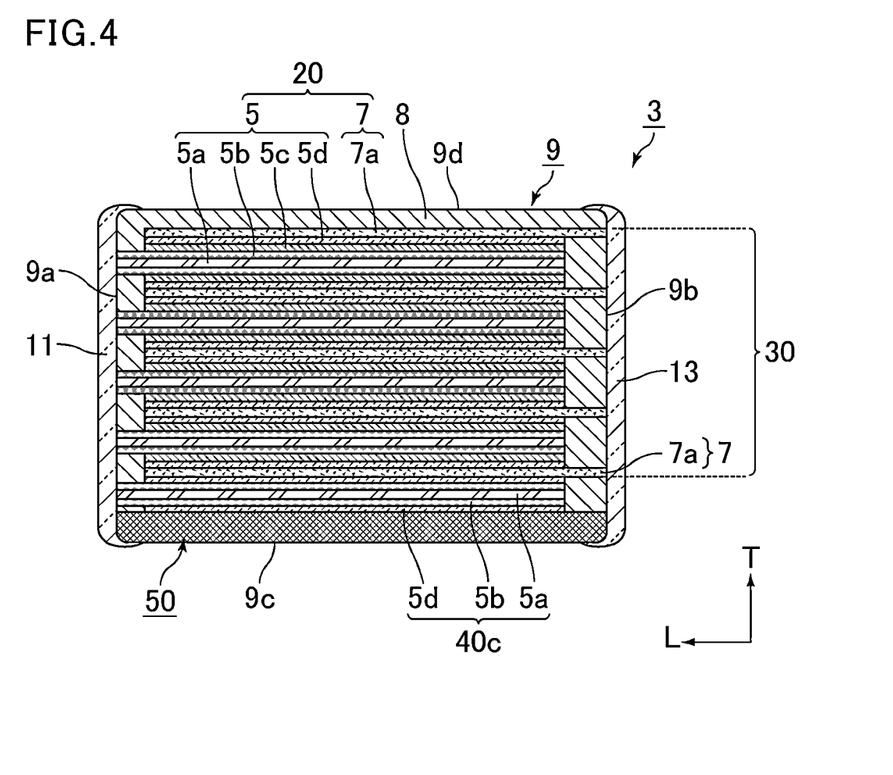
FIG. 4 is a schematic cross-sectional view of still another example of the solid electrolytic capacitor of the present invention.

With reference to FIG. 4, the following describes the case where the dummy layer is a valve-action metal substrate including a dielectric layer on its surface but not including a solid electrolyte layer on the surface of the dielectric layer.

FIG. 4 is a schematic cross-sectional view of still another example of the solid electrolytic capacitor of the present invention.

The solid electrolytic capacitor 3 shown in FIG. 4 includes the resin molding 9 including the capacitor element laminate 30, a dummy layer 40c, the insulating substrate 50, and the sealing resin 8 enclosing the capacitor element laminate 30.

The dummy layer 40c includes the valve-action metal substrate 5a, the dielectric layer 5b on the surface of the valve-action metal substrate 5a, and the conductive layer 5d on the dielectric layer 5b.

In the dummy layer 40c, the dielectric layer 5b is formed on the surface of the valve-action metal substrate 5a but no solid electrolyte layer is formed on the surface of the dielectric layer 5b. Thus, the dummy layer 40c, which is opposite to the electrode lead-out layer 7a, does not contribute to the capacity of the capacitor.

Figure 5:
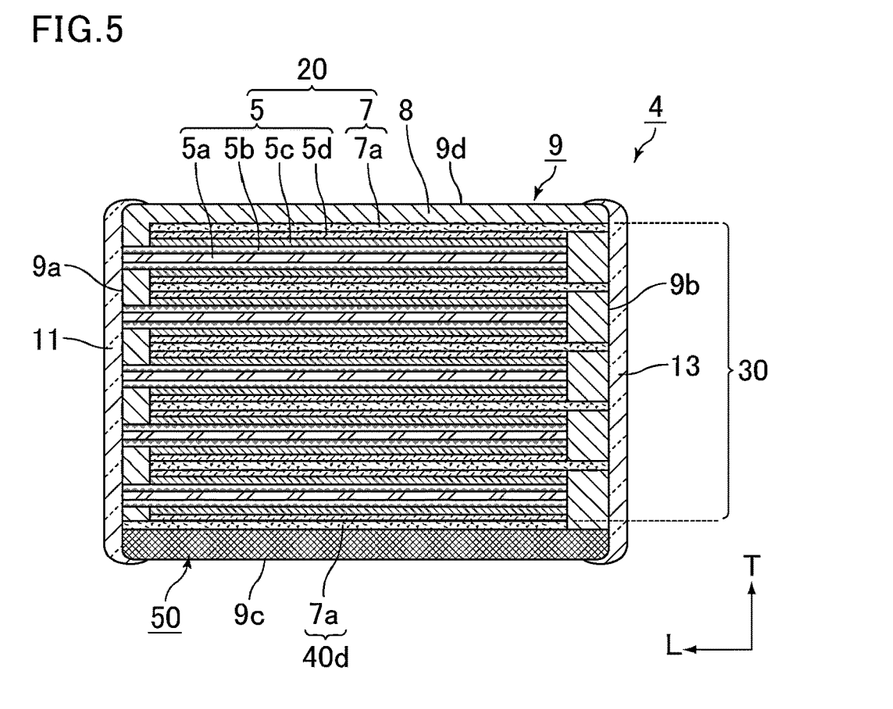
FIG. 5 is a schematic cross-sectional view of still another example of the solid electrolytic capacitor of the present invention.

With reference to FIG. 5, the following describes the case where the dummy layer is an electrode lead-out layer exposed at the first end surface of the resin molding.

FIG. 5 is a schematic cross-sectional view of still another example of the solid electrolytic capacitor of the present invention.

The solid electrolytic capacitor 4 shown in FIG. 5 includes the resin molding 9 including the capacitor element laminate 30, a dummy layer 40d, the insulating substrate 50, and the sealing resin 8 enclosing the capacitor element laminate 30.

The solid electrolytic capacitor 4 is different from any of the solid electrolytic capacitor 1, the solid electrolytic capacitor 2, and the solid electrolytic capacitor 3 respectively shown in FIG. 2, FIG. 3, and FIG. 4 in that one of the first layers 5 is adjacent to the lowest bottom of the capacitor element laminate 30 (i.e., adjacent to the dummy layer).

The dummy layer 40d is defined by the electrode lead-out layer 7a exposed at the first end surface 9a of the resin molding 9.

The electrode lead-out layer 7a defining the dummy layer 40d is opposite to the first layer 5 adjacent to the lowest bottom of the capacitor element laminate 30, but is electrically connected to the opposing first layer 5 via the first external electrode 11, and thus does not contribute to the capacity of the capacitor.

Alternatively, two first layers or two second layers may be successively stacked on one of main surfaces of the capacitor element laminate in the lamination direction, and an insulating substrate may be arranged on an outer side of the stack of the two first layers or the two second layers, whereby the outer first or second layer (i.e., the layer adjacent to the insulating substrate) can be provided as a dummy layer.

For example, when two first layers are successively stacked on the bottom surface of the capacitor element laminate and an insulating substrate is arranged on an outer side of the stack of the two first layers, the inner first layer (i.e., the first layer further from the insulating substrate) is opposite to the second layer and contributes to the capacitor of the capacitor capacity. In contrast, there is no second layer opposite to the outer first layer (i.e., the first layer adjacent to the insulating substrate). Thus, the outer first layer does not contribute to the capacity of the capacitor. Therefore, the outer first layer serves as a dummy layer.

There may be a case where two second layers are successively stacked adjacent to the insulating substrate of the capacitor element laminate. Also in this case, as in the first layers, the inner second layer contributes to the capacity of the capacitor, and the outer second layer serves as a dummy layer.

Method of Producing Solid Electrolytic Capacitor

The solid electrolytic capacitor of the present invention can be produced by the following method, for example.

Production of Capacitor Element

A valve-action metal foil such as aluminum foil including a porous layer such as an etched layer on its surface is provided, and a dielectric layer is formed on the surface of the porous layer by anode oxidation.

A solid electrolyte layer is formed on the dielectric layer by screen printing, and subsequently, a carbon layer as a conductive layer is formed on the solid electrolyte layer by screen printing to produce a first layer.

Further, an electrode lead-out layer as a second layer is arranged on the carbon layer as the first layer.

A capacitor element is obtained by the above step.

Stacking of Capacitor Elements and Sealing with Resin

Multiple capacitor elements are stacked to provide a capacitor element laminate, and a dummy layer and an insulating substrate are stacked thereon. Then, the resulting product is enclosed in a sealing resin by a compression mold to produce a resin molding.

Preferably, the capacitor elements are stacked on the insulating substrate as a support substrate.

The capacitor elements may be stacked on the insulating substrate by, for example, a method in which a dummy layer is first stacked on the insulating substrate, and capacitor elements are stacked on the dummy layer. Here, the first layers and the second layers may be alternately stacked, instead of stacking the capacitor elements.

A resin molding including a capacitor element laminate, a dummy layer, an insulating substrate, and a sealing resin can be obtained by the above procedure.

Formation of External Electrodes

A first external electrode and a second external electrode are formed respectively on a first end surface and a second end surface of the resin molding.

The solid electrolytic capacitor of the present invention can be obtained by the above steps.

EXAMPLES

The solid electrolytic capacitor of the present invention was evaluated below in terms of changes in ESR before and after reflow.

Production of Sample 1

The capacitor element laminate, the dummy layer, and the insulating substrate configured as shown in FIG. 1 and FIG. 2 were enclosed by a sealing resin containing an epoxy resin and silica particles, whereby a resin molding was obtained. An electrode lead-out layer as a second layer was arranged adjacent to the lowest bottom of the capacitor element laminate (i.e., adjacent to the dummy layer). A dummy layer was arranged on the bottom surface of the capacitor element laminate.

The dummy layer included a dielectric layer on the surface of the valve-action metal substrate, and a solid electrolyte layer and a conductive layer were arranged in the stated order on the surface of the dielectric layer. The valve-action metal substrate was exposed at the second end surface, not the first end surface, of the resin molding.

Subsequently, each of the first end surface and the second end surface of the resin molding was subjected to Ni electroplating, electroless Ni plating, and Sn electroplating in the stated order, whereby a first external electrode and a second external electrode were formed. The average coefficient of linear expansion of the first external electrode and the average coefficient of linear expansion of the second external electrode in a direction along the lamination direction of the capacitor element laminate were each 30 ppm/K to 60 ppm/K.

The insulating substrate used was CS-33565 (coefficient of linear expansion $\alpha_2$ in a direction along the lamination direction of the capacitor element laminate: 160 ppm/K) available from Risho Kogyo Co., Ltd.

Production of Sample 2

A sample 2 was produced by a similar procedure as the sample 1, except that no dummy layer was arranged.

Measurement of ESR Before and After Reflow

The ESR before and after reflow of 100 samples 1 and 100 samples 2 was measured using an impedance analyzer.

Figure 6:
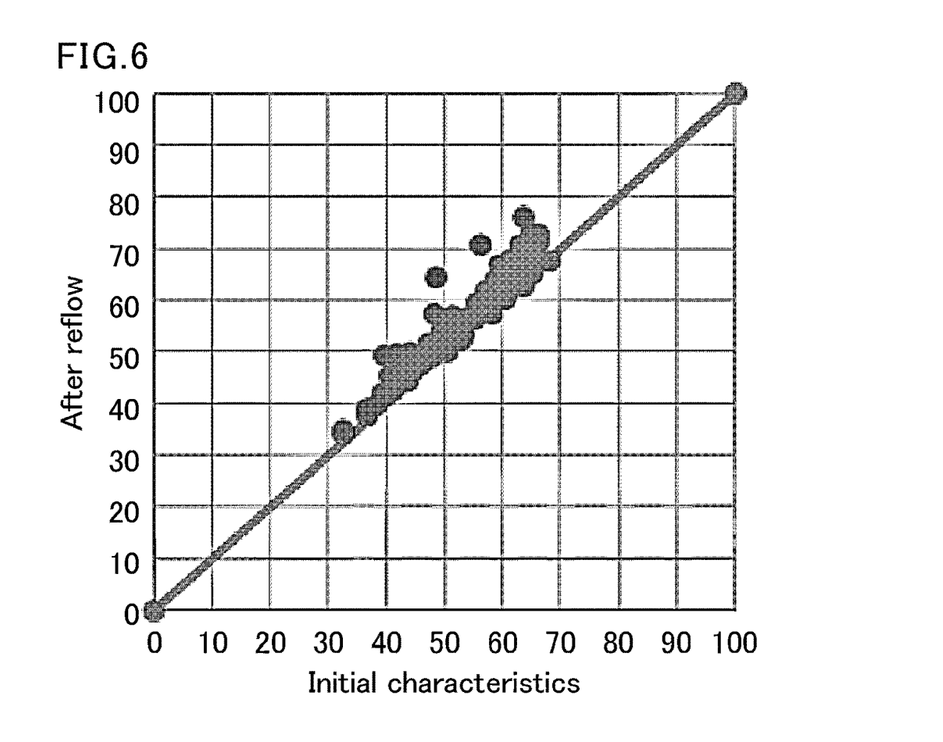
FIG. 6 is a graph showing ESR before and after reflow of samples 1.
Figure 7:
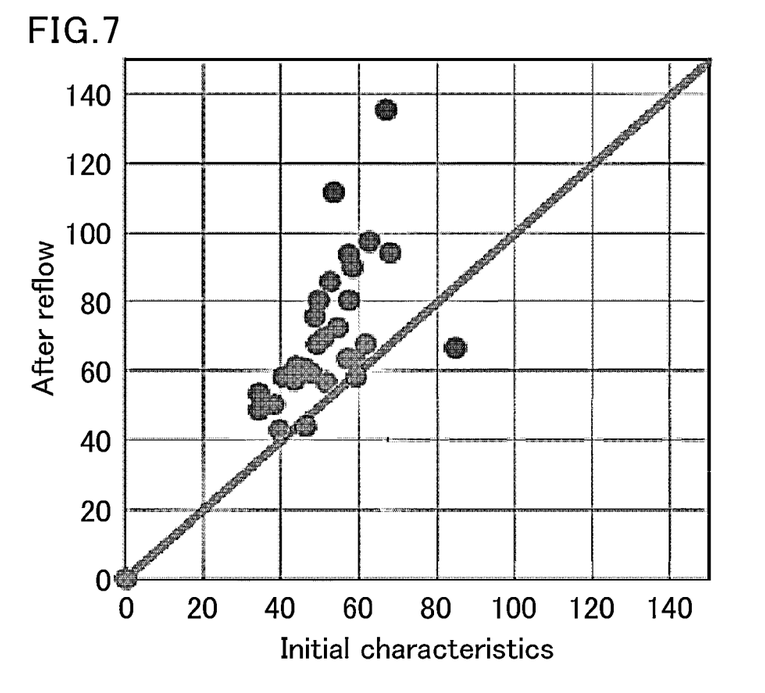
FIG. 7 is a graph showing ESR before and after reflow of samples 2.

Reflow was performed under conditions at 260° C. for 30 seconds. FIG. 6 and FIG. 7 show the results.

FIG. 6 is a graph showing ESR before and after reflow of the samples 1. FIG. 7 is a graph showing ESR before and after reflow of the samples 2.

The horizontal axis shows ESR before reflow, and the vertical axis shows ESR after reflow. Thus, in each of FIG. 6 and FIG. 7, a dot further above a slope 1 represented by a thick line indicates a further increase in ESR by reflow. It is clear from FIG. 6 and FIG. 7 that changes in ESR before and after reflow are small in each sample 1, which is the solid electrolytic capacitor of the present invention, compared to the samples 2.

REFERENCE SIGNS LIST 1, 2, 3, 4: solid electrolytic capacitor
5: first layer
5a: valve-action metal substrate
5b: dielectric layer
5c: solid electrolyte layer
5d: conductive layer
7: second layer
7a: electrode lead-out layer
8: sealing resin
9: resin molding
9a: first end surface of resin molding
9b: second end surface of resin molding
9c: bottom surface of resin molding
9d: top surface of resin molding
9e: first side surface of resin molding
9f: second side surface of resin molding
11: first external electrode
13: second external electrode
20: capacitor element
30: capacitor element laminate
40a: first layer (dummy layer) exposed at second end surface of resin molding
40b: insulating sheet (dummy layer)
40c: first layer (dummy layer) not including solid electrolyte layer on surface of dielectric layer
40d: electrode lead-out layer (dummy layer) exposed at first end surface of resin molding
50: insulating substrate

The invention claimed is:

1. A solid electrolytic capacitor, comprising:
a resin molding including:
a capacitor element laminate, wherein the capacitor element laminate includes a first layer and a second layer that are laminated together, the first layer includes a valve-action metal substrate exposed at a first end surface of the resin molding having a dielectric layer on a surface thereof and a solid electrolyte layer on the dielectric layer, the second layer includes an electrode lead-out layer exposed at a second end surface of the resin molding;
an insulating substrate; and
a sealing resin enclosing the capacitor element laminate;
a first external electrode on the first end surface of the resin molding and electrically connected to the valve-action metal substrate;
a second external electrode on the second end surface of the resin molding and electrically connected to the electrode lead-out layer; and
a dummy layer not contributing to a capacity of the capacitor on a main surface of the capacitor element laminate in a lamination direction thereof and adjacent to the insulating substrate,
wherein the dummy layer includes a valve-action metal substrate exposed at the second end surface of the resin molding.

2. The solid electrolytic capacitor according to claim 1, wherein a difference in average coefficient of linear expansion between the insulating substrate and the first external electrode and a difference in average coefficient of linear expansion between the insulating substrate and the second external electrode in a direction along the lamination direction of the capacitor element laminate and in a temperature range of 20° C. to 260° C. are each 50 [ppm/K] or more.

3. The solid electrolytic capacitor according to claim 2, wherein an average coefficient of linear expansion of the insulating substrate in the direction along the lamination direction of the capacitor element laminate and in the temperature range of 20° C. to 260° C. is 80 [ppm/K] to 160 [ppm/K].

4. The solid electrolytic capacitor according to claim 3, wherein an average coefficient of linear expansion of the first external electrode and an average coefficient of linear expansion of the second external electrode in the direction along the lamination direction of the capacitor element laminate and in the temperature range from 20° C. to 260° C. are each 5 [ppm/K] to 80 [ppm/K].

5. The solid electrolytic capacitor according to claim 2, wherein an average coefficient of linear expansion of the first external electrode and an average coefficient of linear expansion of the second external electrode in the direction along the lamination direction of the capacitor element laminate and in the temperature range from 20° C. to 260° C. are each 5 [ppm/K] to 80 [ppm/K].

6. The solid electrolytic capacitor according to claim 1, wherein the dummy layer is exposed at the second end surface of the resin molding and further includes a dielectric layer on a surface of the valve-action metal substrate, but not including a solid electrolyte layer on a surface of the dielectric layer.

7. The solid electrolytic capacitor according to claim 1, wherein the dummy layer is exposed at the second end surface of the resin molding and further includes a dielectric layer on a surface of the valve-action metal substrate, and a solid electrolyte layer on a surface of the dielectric layer.

8. The solid electrolytic capacitor according to claim 7, wherein the dummy layer further includes a conductive layer on a surface of the solid electrolyte layer.

9. The solid electrolytic capacitor according to claim 1, wherein an average coefficient of linear expansion of the insulating substrate in a direction along the lamination direction of the capacitor element laminate and in a temperature range of 20° C. to 260° C. is 80 [ppm/K] to 160 [ppm/K].

10. The solid electrolytic capacitor according to claim 1, wherein the insulating substrate comprises at least one insulating material selected from a glass epoxy resin, a glass composite, a phenolic resin, a polyimide resin, a polyamide resin, a fluororesin, a polyphenylene oxide resin, and a bismaleimide-triazine resin.

11. The solid electrolytic capacitor according to claim 1, wherein an average coefficient of linear expansion of the first external electrode and an average coefficient of linear expansion of the second external electrode in a direction along the lamination direction of the capacitor element laminate and in a temperature range from 20° C. to 260° C. are each 5 [ppm/K] to 80 [ppm/K].

12. A solid electrolytic capacitor, comprising:
   a resin molding including:
      a capacitor element laminate, wherein the capacitor element laminate includes a first layer and a second layer that are laminated together, the first layer includes a valve-action metal substrate exposed at a first end surface of the resin molding having a dielectric layer on a surface thereof and a solid electrolyte layer on the dielectric layer, the second layer includes an electrode lead-out layer exposed at a second end surface of the resin molding;
      an insulating substrate; and
      a sealing resin enclosing the capacitor element laminate;
   a first external electrode on the first end surface of the resin molding and electrically connected to the valve-action metal substrate;
   a second external electrode on the second end surface of the resin molding and electrically connected to the electrode lead-out layer; and
   a dummy layer not contributing to a capacity of the capacitor on a main surface of the capacitor element laminate in a lamination direction thereof and adjacent to the insulating substrate,
   wherein the dummy layer is an electrode lead-out layer exposed at the first end surface of the resin molding.

13. A solid electrolytic capacitor, comprising:
   a resin molding including:
      a capacitor element laminate, wherein the capacitor element laminate includes a first layer and a second layer that are laminated together, the first layer includes a valve-action metal substrate exposed at a first end surface of the resin molding having a dielectric layer on a surface thereof and a solid electrolyte layer on the dielectric layer, the second layer includes an electrode lead-out layer exposed at a second end surface of the resin molding;
      an insulating substrate; and
      a sealing resin enclosing the capacitor element laminate;
   a first external electrode on the first end surface of the resin molding and electrically connected to the valve-action metal substrate;
   a second external electrode on the second end surface of the resin molding and electrically connected to the electrode lead-out layer; and
   a dummy layer not contributing to a capacity of the capacitor on a main surface of the capacitor element laminate in a lamination direction thereof and adjacent to the insulating substrate,
   wherein two first layers or two second layers are successively stacked on the main surface of the capacitor element laminate in the lamination direction, and the insulating substrate is on an outer side of the stack of the two first layers or the two second layers such that the dummy layer is a layer of one of the two first layers or the two second layers that is adjacent to the insulating substrate.

* * * * *